(12) United States Patent
Hansen et al.

(10) Patent No.: US 8,909,141 B2
(45) Date of Patent: Dec. 9, 2014

(54) SECURE INDUCTIVELY-COUPLED COMMUNICATIONS SYSTEMS

(75) Inventors: Thorkild Hansen, Brighton, MA (US); Ralf Birken, Somerville, MA (US); Scott Macintosh, Boston, MA (US); Michael L. Oristaglio, Newtown, CT (US)

(73) Assignee: Seknion, Inc., Hopkinton, MA (US)

( * ) Notice: Subject to any disclaimer, the term of this patent is extended or adjusted under 35 U.S.C. 154(b) by 233 days.

(21) Appl. No.: 13/483,241

(22) Filed: May 30, 2012

(65) Prior Publication Data

US 2012/0322372 A1 Dec. 20, 2012

Related U.S. Application Data

(60) Provisional application No. 61/498,655, filed on Jun. 20, 2011.

(51) Int. Cl.
*H04B 5/00* (2006.01)

(52) U.S. Cl.
CPC ............ *H04B 5/0031* (2013.01); *H04B 5/0081* (2013.01)
USPC ...................................... 455/41.1; 455/67.11

(58) Field of Classification Search
CPC .......... H04B 1/00; H04B 1/16; H04B 5/0031; H04B 5/0053; H04B 5/0056; H04B 5/0075; H04B 5/0081
USPC ........ 455/41.1, 41.2, 422.1, 501, 63.1, 67.11, 455/550.1, 561, 101
See application file for complete search history.

(56) References Cited

U.S. PATENT DOCUMENTS

| | | | | |
|---|---|---|---|---|
| 8,085,106 | B2 * | 12/2011 | Huda et al. | 375/239 |
| 2003/0134605 | A1 * | 7/2003 | Kim et al. | 455/101 |
| 2006/0273786 | A1 | 12/2006 | Smith et al. | |
| 2009/0006263 | A1 | 1/2009 | Power et al. | |
| 2009/0041241 | A1 | 2/2009 | Dobyns et al. | |
| 2009/0192755 | A1 | 7/2009 | Sheiretov et al. | |
| 2011/0207457 | A1 * | 8/2011 | Nagata et al. | 455/550.1 |

* cited by examiner

*Primary Examiner* — Thanh Le
(74) *Attorney, Agent, or Firm* — Fulbright & Jaworski LLP

(57) ABSTRACT

Security in inductively coupled communications systems, such as near field communications (NFC), may be improved by restricting signals carrying user data to an authorized data transmission region. Security may be particularly important when the NFC carries financial transaction information or authorization credentials. Scramble signals may be transmitted along with data signals carrying the user data and designed to overshadow the data signals outside of the authorized data transmission region. The scramble signal transceiver may be designed to have a slower decay rate with distance from the transceiver than the data signal. By adjusting the power levels of the scramble signal and the data signal, the authorized data transmission region may be adjusted. Scramble signals may not be required if the data signal strength outside the authorized data transmission region is below the minimum threshold value required by eavesdropping receivers.

9 Claims, 14 Drawing Sheets

US 8,909,141 B2

SECURE INDUCTIVELY-COUPLED COMMUNICATIONS SYSTEMS

PRIORITY CLAIM

This application claims priority to U.S. Provisional Patent Application No. 61/498,655 entitled "Secure Near Field Communications" to Thorkild Hansen et al. and filed on Jun. 20, 2011.

TECHNICAL FIELD

This disclosure relates to communications through inductive coupling. More particularly, the disclosure relates to a method and apparatus for improving the security of inductively coupled systems, such as near field communications systems (NFC), by preventing eavesdropping.

BACKGROUND

Near Field Communication (NFC) is a set of short-range wireless technologies that operate within the globally available and unlicensed radio frequency ISM band of 13.56 MHz. The air interface for NFC is standardized in ISO/IEC 18092/ECMA-340, "Near Field Communication Interface and Protocol-1 (NFCIP-1)" and ISO/IEC 21481/ECMA-352 "Near Field Communication Interface and Protocol-2 (NFCIP-2)". NFC is an extension to Radio Frequency Identification (RFID), and the standards governing NFC originated in RFID.

NFC has a wide range of applications. For example, NFC may be used in mobile ticketing for public transport, movies, concerts, and sporting events. In another example, NFC may be used in mobile payment, such as where users can pay for goods using NFC-enabled devices, either NFC-enabled phones with stored data that act as a debit/credit payment card or NFC-powered contactless payment cards placed in proximity of readers. In a further example, NFC may be used in smart posters and objects, such as NFC-enabled phones can be used to read RFID tags on commercial establishments' signs for information or promotions or scan outdoor billboards. In yet another example, NFC may be used in Bluetooth pairing, such as pairing of Bluetooth 2.1 devices with NFC support by bringing the devices close together and accepting the pairing. In a further example, NFC may be used in P2P payment, such as when: users make payment to each other by tapping phones together and entering the amount of money to be transferred. Other documents that may be transferred include government, employee, and organization identity documents. In another example, NFC may be used in mobile commerce, such as delivery of in-store promotions and couponing, driving sales of products, and providing value-added services. In still a further example, NFC may be used in electronic keys, such as when NFC-enabled phones serve as replacements for physical car keys, house/office keys, and hotel room keys. In a further example, NFC may be used in ubiquitous information applications, such as audio tour guides for art museums or public monuments, book sales and lending, movie trailers, DVD rentals, and music purchases. Additional uses for NFC include health and safety applications, home healthcare visits, healthcare campus safety check-ins, social networking, and smart mobility.

Radio signals that carry the data to be transferred between transceivers (a transceiver is a device such as a cell phone that can both transmit and receive) are not confined to the immediate vicinity of these transceivers. Hence, an eavesdropper with a sufficiently sensitive receiver can pick up this data transmission. Studies have revealed that the distance from which an attacker is able to eavesdrop NFC communications is typically a small number of meters. Eavesdropping may be possible at distances up to 5 meters.

Seknion Inc. has developed technology related to security in wireless communications and radio frequency identification (RFID) disclosed in U.S. Pat. No. 7,398,078, U.S. Pat. No. 7,751,799, U.S. Pat. No. 7,456,72, U.S. Pat. No. 7,889,054, and U.S. Pat. No. 7,605,684. This technology includes the broadcasting of both a data signal intended for authorized transceivers and one or more scramble signals which overshadow the data signal to prevent reception of the data signal by unauthorized transceivers. A system operating in accordance with these disclosures increases the likelihood that an eavesdropper records only the scramble signal. In particular, U.S. Pat. No. 7,889,054 discloses the selection of effective scramble signals, which may also be known as jamming signals, masking signals, and guard signals.

Encryption of the data transmitted between NFC devices may also improve security. However, encryption increases the power and processing requirements of the NFC devices, which are designed to be cheap and low-cost devices. Additionally, encryption does not prevent an eavesdropper from acquiring the data. Instead, encryption only hinders the eavesdropper from deciphering the data. Encryption techniques are always subject to skilled computer user's attempts to break the encryption. A better solution would prevent the eavesdropper from receiving any data.

BRIEF SUMMARY

According to one embodiment, a method includes transmitting, in a near field, a data signal with a data field distribution having a first decay rate, in which the first decay rate is greater than $1/r^3$.

According to another embodiment, a method includes transmitting a data signal with a data field distribution having a first decay rate, in which the data signal carries user data. The method also includes transmitting one or more scramble signals with one or more scramble field distributions corresponding to the one or more scramble signals having a second decay rate different from the first decay rate, in which the scramble signal does not carry user data. The method further includes adjusting the data field distribution and the scramble field distributions such that one or more of the scramble signals overshadow the data signal in all but selected regions.

According to a further embodiment, an apparatus includes a near field communications (NFC) receiver. The apparatus also includes at least one scramble object, in which the at least one scramble object defines an authorized data transmission region around the NFC receiver.

The present disclosure is directed to a method for securely transmitting data using inductive coupling comprising the step of transmitting the data with a field distribution that decays as $1/r^n$, where $n>3$.

In one embodiment of the present disclosure the data is broadcast with a coil system that ensures $1/r^n$ decay, where $n>3$. In one embodiment of the present disclosure the data is broadcast with a coil system that consists of two side-by-side coils and produces $1/r^4$ decay. In one embodiment of the present disclosure the data is broadcast with a coil system that consists of two concentric coils and produces $1/r^5$ decay.

The present disclosure is directed to a method for securely transmitting data using inductive coupling. The method includes transmitting the data with a data field distribution. The method also includes transmitting one or more scramble signals from which data cannot be inferred with one or more scramble field distributions. The method further includes adjusting the data field distribution and the scramble field distributions such that one or more of the scramble signals overshadow the data signal in all but selected regions.

In one embodiment of the present disclosure, the data signal is broadcast with a transmitter that has approximately zero magnetic dipole moment and one or more of the scramble signals are broadcast with a transmitter that has also approximately zero magnetic dipole moment. In one embodiment of the present disclosure, the method further includes the step of adjusting the data and scramble field distributions by adjusting the strength of the coefficients in multipole expansions.

In one embodiment of the present disclosure, the data signal is broadcast with a transmitter that has approximately zero magnetic dipole moment and one or more of the scramble signals are broadcast with a transmitter that has non-zero magnetic dipole moment. In one embodiment of the present disclosure, the method further includes the step of adjusting the data and scramble field distributions by adjusting the strength of the coefficients in multipole expansions.

In one embodiment of the present disclosure, the data signal is broadcast with a transmitter that has non-zero magnetic dipole moment and one or more of the scramble signals are broadcast with a transmitter that has approximately zero magnetic dipole moment. In one embodiment of the present disclosure, the method further comprises the step of adjusting the data and scramble field distributions by adjusting the strength of the coefficients in multipole expansions.

In one embodiment of the present disclosure, the method further includes the steps of transmitting the data signal and transmitting the scramble signals using one or more coil antennas. In one embodiment of the present disclosure, the method further includes the step of adjusting the data field distributions and the scramble field distributions using analytical coil synthesis techniques. In one embodiment of the present disclosure, the method further includes the step of adjusting the data field distributions and the scramble field distributions using iterative coil synthesis techniques.

In one embodiment of the present disclosure, the method further includes the step of transmitting the data signal and the scramble signal using planar coil geometries. In one embodiment of the present disclosure, the method further includes the step of transmitting the scramble signals using concentric coil geometries.

In one embodiment of the present disclosure the transmitter and authorized receiver employ matched coils to reject the scramble signal. In one embodiment of the present disclosure, the receiver has approximately zero magnetic dipole moment.

In one embodiment of the present disclosure, the step of receiving signals uses planar coil antennas. In one embodiment of the present disclosure, the step of receiving signals uses concentrically placed coil antennas.

In one embodiment of the present disclosure, the region in which the authorized data transmission takes place is shielded by broadcasting scramble signals with scramble signal transmitters placed in the vicinity of this region. In one embodiment of the present disclosure, the method further includes the step of employing scramble signal transmitters that have nulls (zero or low magnetic induction strength) in the region in which the authorized data transmission takes place.

In one embodiment of the present disclosure, the region in which the authorized data transmission takes place is shielded by scatterers placed in the vicinity of this region to create a diffuse distribution of scramble and data signals in the region where eavesdroppers may be present.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. For example, the methods and structures disclosed within this application may apply to any communications system that employs inductive coupling. It should also be realized by those skilled in the art that such equivalent constructions do not depart from the spirit and scope of the disclosure as set forth in the appended claims. For example, although structures with zero magnetic dipole moment are disclosed, the zero magnetic dipole moment may only be achieved under ideal circumstances. Thus, some small magnetic dipole moment may exist in practical applications of the designs and methods disclosed within this application. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings.

DETAILED DESCRIPTION

Security in near field communications (NFC) may be improved according to one embodiment by designing transmitters with decay rates such that any data signals transmitted during NFC are not received by distant receivers. Security may further be improved according to another embodiment by transmitting scramble signals in a region of NFC to overshadow the data signals outside of an authorized data transmission region. The scramble signals may be transmitted by transmitters with different decay rates than the transmitters for the data signal such that the data signal only overshadows the scramble signal in an authorized data transmission region defined, in part, by the decay rate and transmission power of the transmitters. In another example, scramble transmitters may be placed around the region of authorized data transmission to create scramble signals that overshadow the data signals outside of the authorized data transmission zone.

NFC may occur between transceivers that are less than a wavelength apart and, thus, operate in the inductive coupling domain. Within the domain of inductive coupling, transmitters may be designed that radiate fields with different decay rates. For example, the field of one transmitter disclosed below may decay as $1/r^3$, and the field of another transmitter disclosed below may decay as $1/r^5$, where r is the distance from the transmitter. The decay rate of these and other transmitters may be adjusted to define the region of authorized data transmission.

Scramble signals transmitted in the vicinity of the authorized data transmission region may adjust the size of the authorized data transmission. For example, the region of authorized data transmission may be reduced or increased by adjusting the position, transmission strength, and/or decay rate of a transmitter transmitting a scramble signal. In another example, the region of authorized data transmission may be reduced or increased by adjusting the position, transmission strength, and/or decay rate of a transmitter transmitting a data signal. Employing transmitters with difference decay rates in conjunction with scramble signals may improve security by preventing an eavesdropper from discerning the data signal. Security may further be improved by employing a matched receiver that rejects the scramble signal when placed in a prescribed position near the transmitter.

Figure 1:
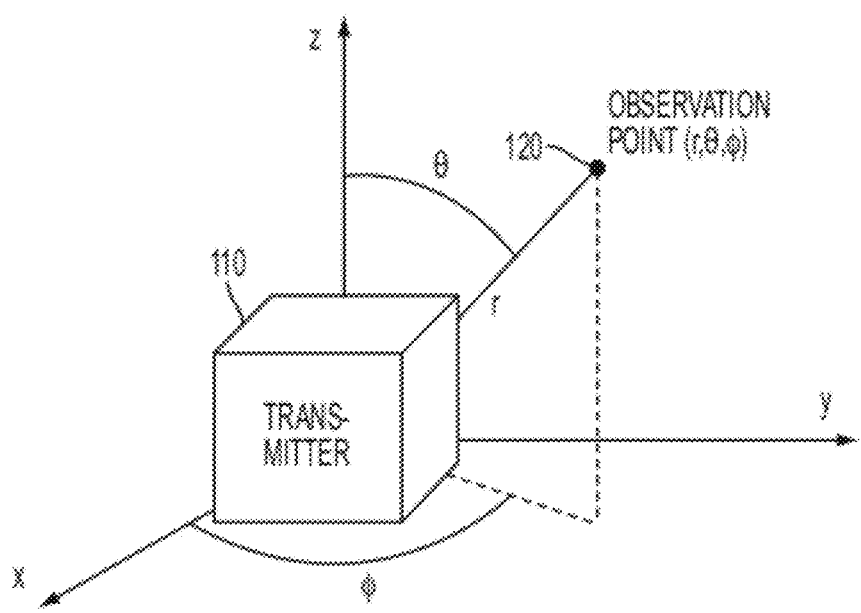
FIG. 1 is a schematic illustrating a transmitter that broadcasts an electromagnetic field observed at the observation point with spherical coordinates $(r,\theta,\phi)$ according to one embodiment of the disclosure.

FIG. 1 is a schematic illustrating a transmitter 110 that broadcasts an electromagnetic field observed at an observation point 120 with spherical coordinates (r,θ,φ) according to one embodiment of the disclosure. The transmitter 110 in FIG. 1 broadcasts an electromagnetic field. For distances less than a wavelength from the transmitter, the magnetic induction, denoted by the vector B, may be expanded in an inverse power series of the distance r to the origin:

$$B(r,\theta,\phi) = \Sigma F_n(\theta,\phi)/r^n.$$

where the summation over n is calculated from 3 to infinity, and (r,θ,φ) are the spherical coordinates of the observation point, as shown in FIG. 1. This formula, which is known as a multipole expansion, may apply to data transmissions between transmitters and receivers that are less than a wavelength apart. Such transmitters and receivers may be inductively coupled.

Vector functions $F_n(\theta,\phi)$ are independent of the coordinate r, and the formula shows that the magnetic induction always decays as $1/r^3$ or faster as the observation point moves away from the transmitter. The first term in the series $F_3(\theta,\phi)$ is proportional to the magnetic dipole moment vector of the transmitter, which may be determined from an integration over the current distribution of the transmitter.

Figure 2:
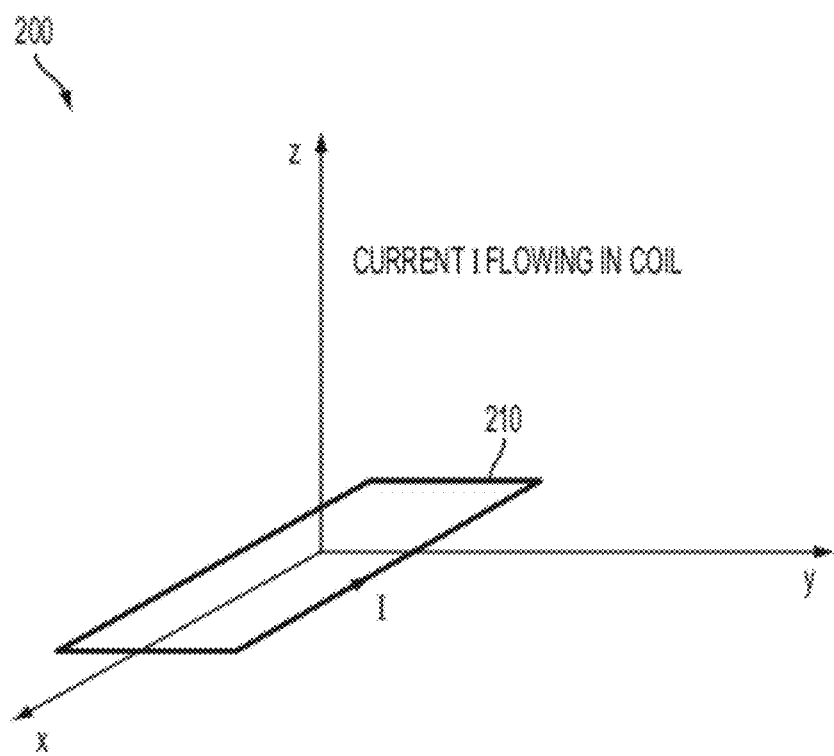
FIG. 2 is a schematic illustrating a rectangular coil in an x-y plane with current I according to one embodiment of the disclosure.

FIG. 2 is a schematic 200 illustrating a rectangular coil 210 in an x-y plane with current I according to one embodiment of the disclosure. A magnetic dipole moment vector of the coil 210 in FIG. 2 may be m=IAz, where I is the current strength, A is the area enclosed by the coil 210, and z is a unit vector pointing in the positive z-direction. For the single coil 210 the magnetic induction decays as $1/r^3$ whenever the current is non-zero. Additional configurations may include multiple rectangular coils.

Figure 3:
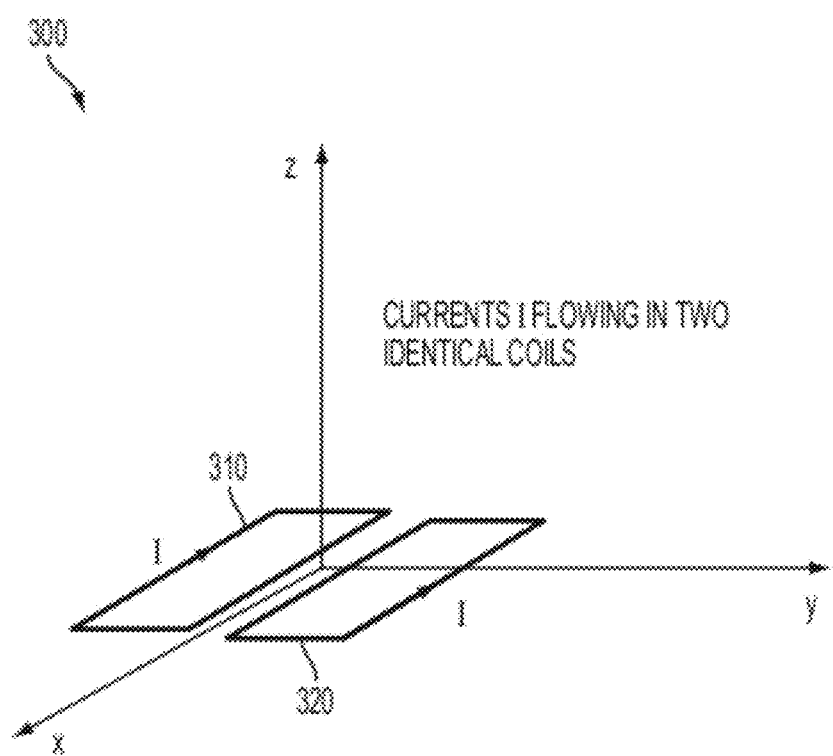
FIG. 3 is a schematic illustrating two rectangular coils in a planar geometry with currents of strength I and flowing in opposite directions in each coil according to one embodiment of the disclosure.

FIG. 3 is a schematic 300 illustrating two rectangular coils 310 and 320 in a planar geometry with currents that both have strength I and flow in opposite directions according to one embodiment of the disclosure. Due to cancellation, the two coils 310 and 320 produce a zero total magnetic dipole moment vector so that $F_3(\theta,\phi)==0$, where "==" means that $F_3(\theta,\phi)$ is zero for all values of (θ,φ). As a result, the magnetic induction decays as $1/r^4$. In another configuration the coils may be configured in a concentric arrangement.

Figure 4:
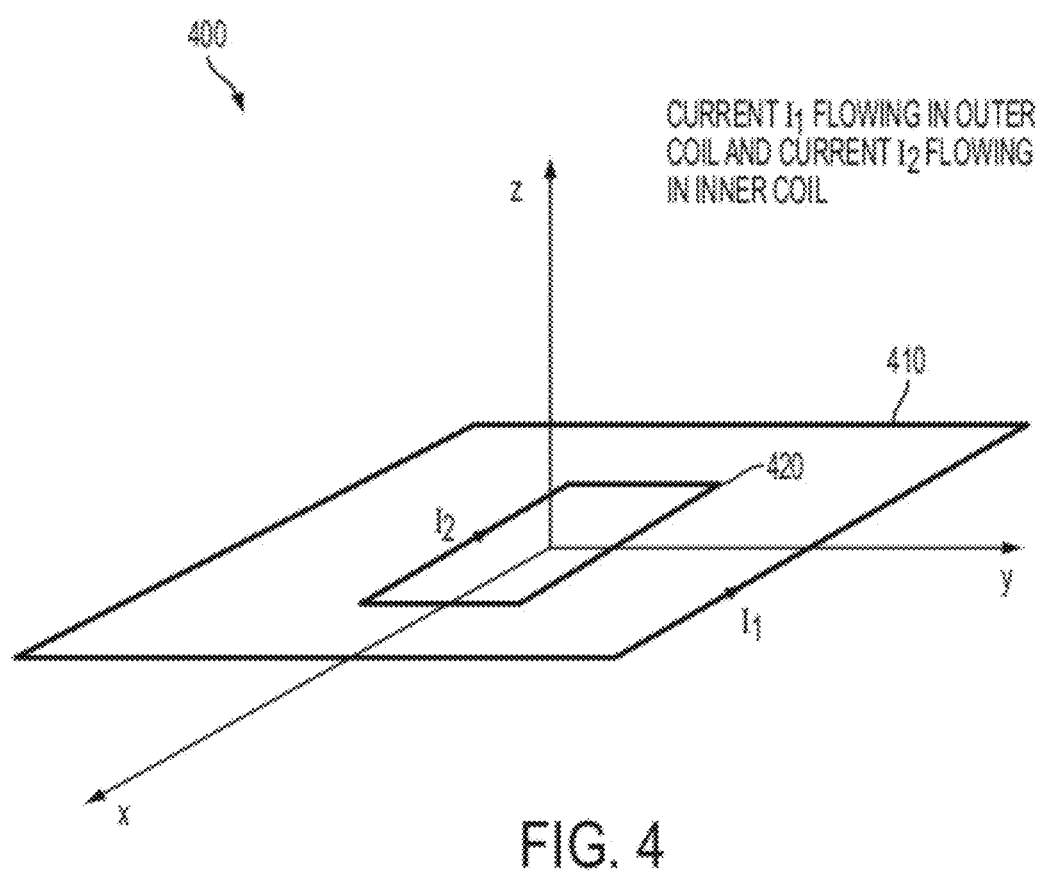
FIG. 4 is a schematic illustrating two concentric coils in a concentric geometry with current $I_1$ and $I_2$ flowing in opposite directions according to one embodiment of the disclosure.

FIG. 4 is a schematic illustrating two concentric coils 410 and 420 in a concentric geometry with current $I_1$ and $I_2$ flowing in opposite directions according to one embodiment of the disclosure. $A_1$ and $A_2$ may be defined as areas enclosed by an outer coil 410 and an inner coil 420 of a coil system 400. The total magnetic dipole moment of the configuration of FIG. 4 may be zero when $I_1A_2=I_2A_1$, with $I_1$ and $I_2$ being the currents in the outer coil 410 and the inner coil 420, respectively. When $I_1A_2=I_2A_1$ then $F_3(\theta,\phi)==0$ and the magnetic induction of the configuration of FIG. 4 may decay at least as fast as $1/r^4$. Additionally, $F_4(\theta,\phi)==0$ when $I_1A_2=I_2A_1$, such that a magnetic induction of the coil system 400 actually decays as $1/r^5$.

Figure 5:
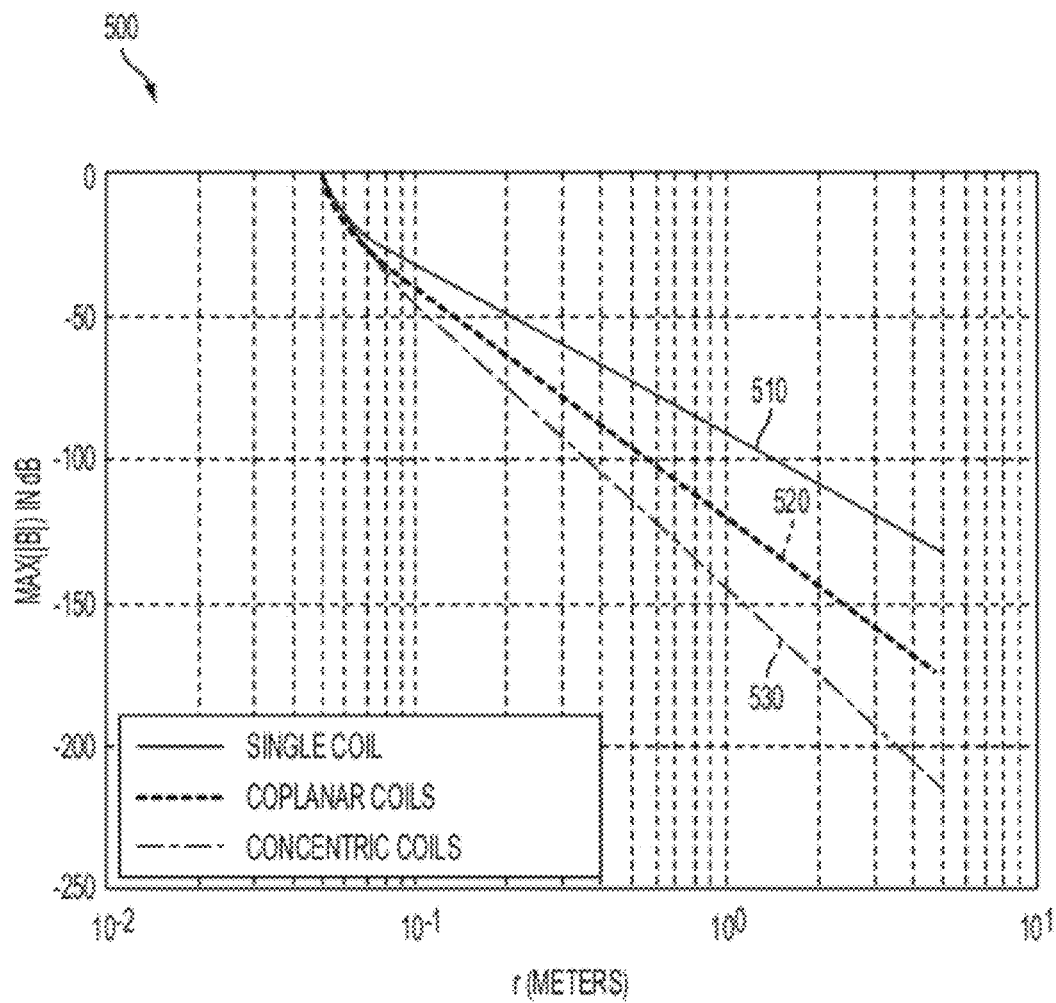
FIG. 5 is a graph illustrating a maximum magnitude of the magnetic induction B over a sphere of radius r, ranging from 5 cm to 5 m for the various coil configurations in FIG. 2, FIG. 3, and FIG. 4 according to one embodiment of the disclosure.

Employing a transmitter with zero magnetic dipole moment, such as the embodiment of FIG. 4, may improve security by reducing eavesdropping. With zero magnetic dipole moment, the magnetic induction may decay more rapidly and may be more difficult to detect. This is illustrated in FIG. 5 as a graph showing a maximum magnitude of the magnetic induction B over a sphere of radius r, ranging from 5 cm to 5 m for the various coil configurations in FIG. 2, FIG. 3, and FIG. 4 according to one embodiment of the disclosure and graphed on a graph 500 as lines 510, 520, and 530, respectively. For these calculations, the coil 210 in FIG. 2 and the outer coil 410 in FIG. 4 have dimensions of 8 cm by 4 cm, the inner coil 420 in FIG. 4 has dimensions 4 cm by 2 cm, and the coils 310 and 320 in FIG. 3 have dimensions of 4 cm by 4 cm. The currents may be adjusted such that a maximum magnitude of the magnetic induction B over a sphere of radius 5 cm is the same for the three coil systems of FIGS. 2-4. FIG. 5 illustrates that for certain embodiments the magnetic induction decays as $1/r^3$, $1/r^4$, and $1/r^5$ for the coil systems of FIG. 2, FIG. 3, and FIG. 4, respectively. At r=5 m, the magnetic induction of the coil system 400 of FIG. 4 may be 80 dB below the magnetic induction of the coil system 200 of FIG. 2.

Eavesdropping may be prevented by reducing the strength of magnetic induction for the location of the eavesdropper below a specific threshold value. According to one embodiment, the threshold value may be −100 dB. For the embodiments of coil transmitters calculated in FIG. 5 an eavesdropper must be within 142 cm, 56 cm, and 35 cm for a single coil, coplanar coils, and concentric coils configured as described above.

Figure 6A:
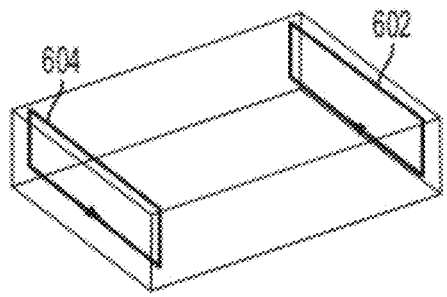
FIGS. 6A-D are schematics illustrating coil systems having zero magnetic dipole moment according to one embodiment of the disclosure.
Figure 6B:
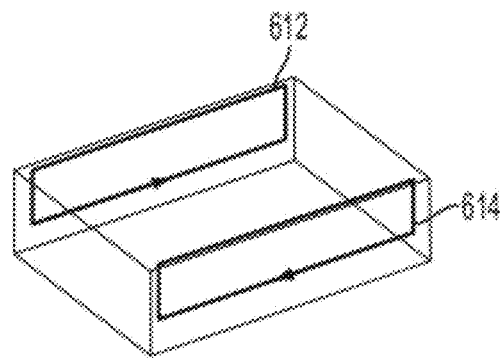
Figure 6C:
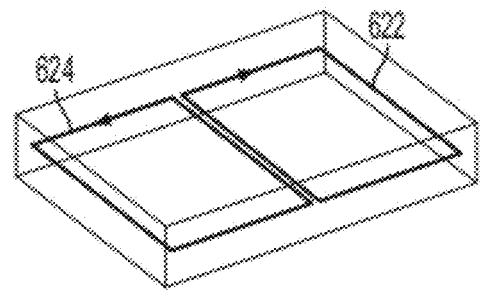
Figure 6D:
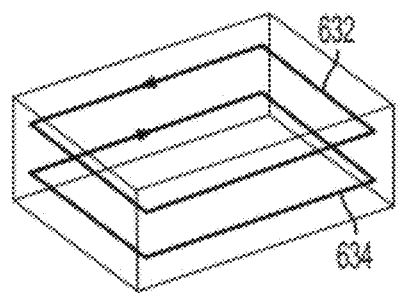

FIGS. 6A-D are schematics illustrating coil systems having zero magnetic dipole moment according to one embodiment of the disclosure. FIG. 6A illustrates a coil system having two current loops 602 and 604 flowing in opposite directions in separate vertical planes. FIG. 6B illustrates a coil system having two current loops 612 and 614 flowing in opposite directions in separate vertical planes. FIG. 6C illustrates a coil system having two current loops 622 and 624 flowing in opposite directions in the same horizontal plane. FIG. 6D illustrates a coil system having current loops 632 and 634 flowing in opposite directions in separate horizontal planes. According to one embodiment the current loops 602 and 604, 612 and 614, 622 and 624, and 632 and 634 have substantially similar current magnitudes. Thus, each of the four coil systems of FIGS. 6A-6D has zero magnetic dipole moment and $F_3(\theta,\phi)=0$. The magnetic induction transmitted by each of these coil systems may decay at least as fast as $1/r^4$ or faster in all directions. Although the coils illustrated in FIGS. 2-4 and 6 are rectangular coils, any of the rectangular coils may be replaced by oval-shaped coils (including elliptical and circular coils).

Eavesdropping may also be prevented by broadcasting both a data signal, including user data, intended for the authorized recipient and one or more scramble signals (also called jamming signals, masking signals, and guard signals), which do not include user data (see U.S. Pat. No. 7,889,054 to Hansen and entitled "Method and apparatus for creating scramble signals in RFID," which is hereby incorporated by reference for a discussion on how to select scramble signals). According to one embodiment, this type of security measure may rely on directionality. According to another embodiment, this type of security measure may rely on decay rate of magnetic induction. In yet another embodiment, this type of security measure may rely on directionality and decay rate. According to one embodiment, security may be increased by broadcasting the data signal with a transmitter that has $F_n(\theta,\phi)=0$ for $n<N_d$, and broadcasting the scramble signal with a transmitter that has $F_n(\theta,\phi)=0$ for $n<N_s$ where $N_d>N_s$.

The functions $F_n(\theta,\phi)$ can be expressed in terms of an integration over the source function for the coil system (including current and material parameters). For example, with currents in free space the functions $F_n(\theta,\phi)$ are the coefficients in a far-field expansion of the Biot and Savart Law expressed in terms of integrations over the current. Hence, the condition $F_n(\theta,\phi)=0$ produces an integral equation where the unknown is the source function for the coil system, and thus forms the basis for coil synthesis techniques. Such integral equations can be solved, given a set of constraints on the source function (coil dimensions etc.), using numerical methods. According to one embodiment, it can be solved using iterative numerical methods.

Directional security is described with reference to FIGS. 7A-B. A coil system 700 includes a first transceiver 710 having a single rectangular coil 710a and a second transceiver 720 having two co-planar rectangular coils 720a and 720b. According to one embodiment, the first coil 710a has dimensions of 8 cm by 4 cm, and the coils 720a and 720b have dimensions of 4 cm by 4 cm. The first transceiver 710 may transmit a data signal, having user data, and the second transceiver 720 may transmit a scramble signal, having no user data. According to one embodiment, the current magnitude in the coil 710a, may be 1 A, and the current magnitude in the coils 720a and 720b may be 10 A.

According to one embodiment, the first transceiver 710 and the second transceiver 720 may be placed on the same board with one coil system on each side. With this coil geometry there may be zero coupling between the transceivers. The three rectangular components of the magnetic induction of the transceivers 710 and 720 are illustrated on an enclosing observation box with dimensions 25 cm by 25 cm by 25 cm in FIG. 7B. Graphs 750, 752, and 754 illustrate the magnitude of the x-component, the y-component, and the z-component of B for the transceiver 710 on the observation box. Graphs 756, 758, and 760 illustrate the magnitude of the x-component, y-component, and the z-component for the transceiver 720 on the observation box. The magnetic induction of the graphs of FIG. 7B in dB is normalized so that one tesla is 0 dB.

Assume that the authorized receiver is a small horizontal loop centered at (x,y,z)=(0, 0, 12.5 cm), and that the eavesdropper is a small horizontal loop at (x,y,z)=(12.5 cm, 0, 0). A small vertical loop may not receive any data signal in the x-y plane. In this situation, the authorized receiver sees only the data signal whereas the eavesdropper sees a combination of the data and scramble signals. The scramble signal at the location of the eavesdropper may be more than 10 dB greater than the data signal. By increasing the strength of the scramble signal, one can make the scramble signal overshadow the data signal by an arbitrary amount at the location of the eavesdropper without introducing any scramble signal at the location of the authorized receiver.

Figure 7A:
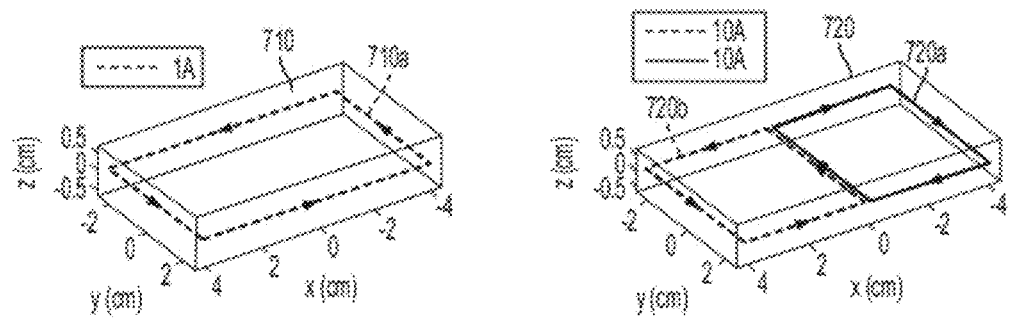
FIG. 7A is a block diagram illustrating a coil system according to one embodiment of the disclosure.
Figure 7B:
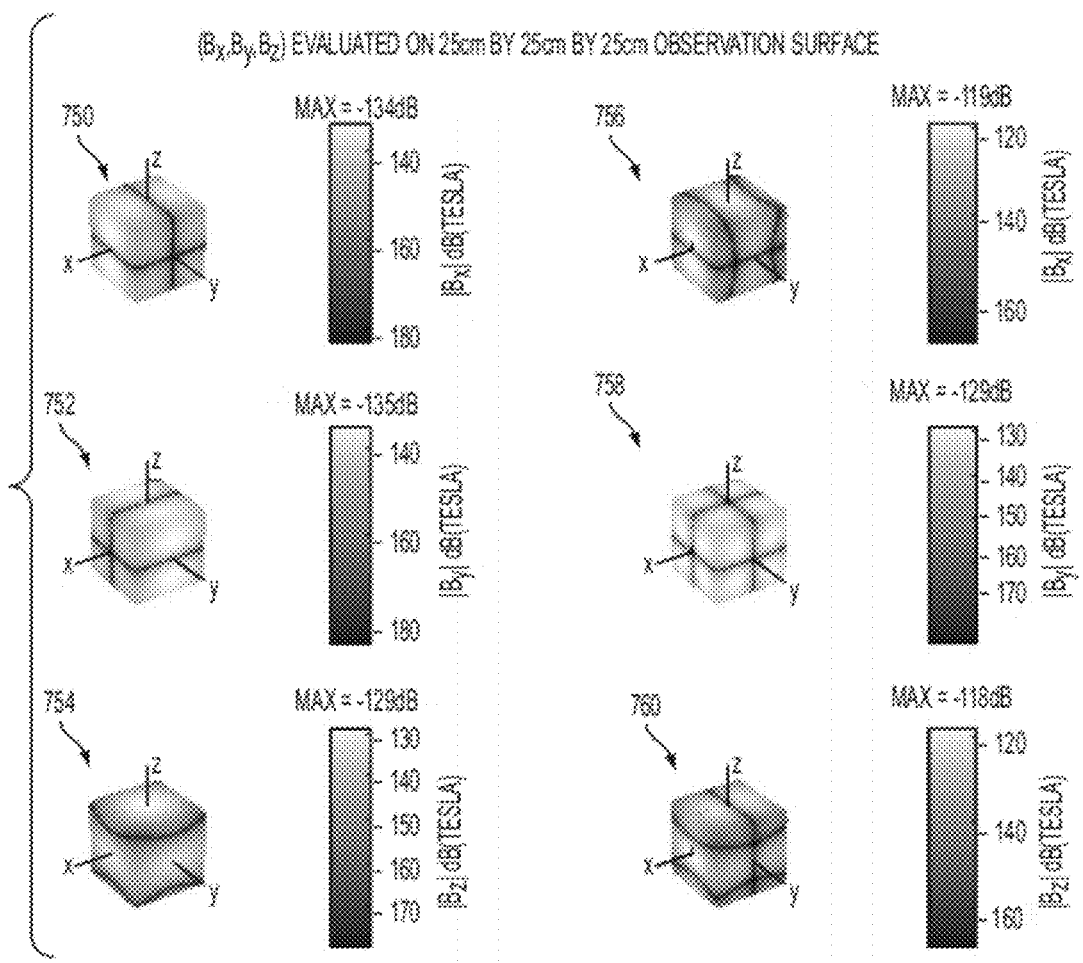
FIG. 7B is a simulated magnetic induction field for the coil system of FIG. 7A along certain observation surfaces according to one embodiment of the disclosure.

The configuration in FIG. 7A may be designed to prevent eavesdropping at any point in the x-y in the plane by transmitting an additional independent scramble signal with a third coil system (not shown) obtained by a 90 degree rotation (with respect to the z-axis) of the transceiver 720. In this configuration, the data signal decays as $1/r^3$ whereas the scramble signal decays as $1/r^4$. According to one embodiment, the scramble signal may be transmitted such that the strength of the scramble signal exceeds the strength of the data signal in directions where eavesdroppers may be present at least out to a distance where the data signal strength falls below the threshold of eavesdropping receivers.

Figure 8:
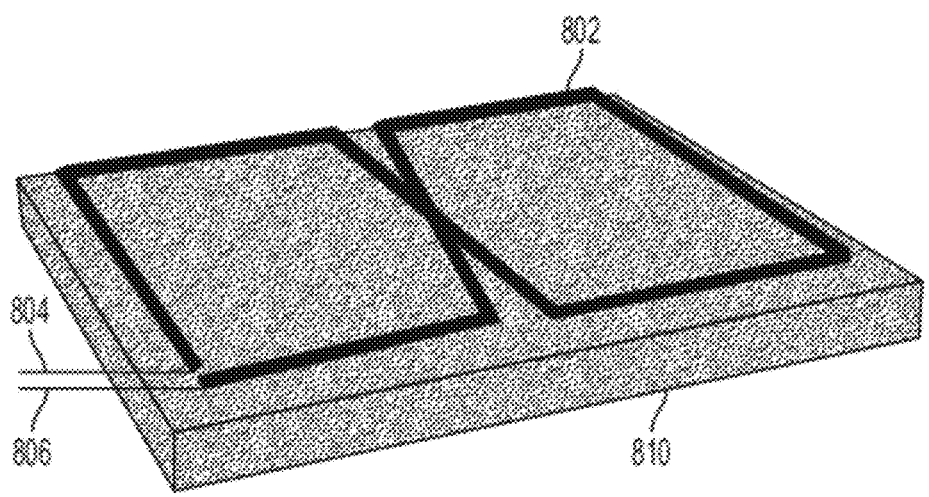
FIG. 8 is a schematic illustrating a matched receiver according to one embodiment of the disclosure.

According to one embodiment, eavesdropping may be prevented by employing a matched receiver. A matched receiver may substantially reject the scramble signal while substantially accepting the data signal when placed at a desired location. FIG. 8 is a schematic illustrating a matched receiver according to one embodiment of the disclosure. A matched receiver may include a coil 802 with leads 804 and 806. The receiver 800 may be placed a short distance (approximately a few centimeters) above a box 810 including a data signal transmitter (not shown) and a scramble signal transmitter (not shown) during NFC. In one embodiment, the matched receiver may be substantially similar and located parallel to the transceiver 720 when communicating with the transceiver 720. In one embodiment, if the matched receiver has a two co-planar loops, the data signal transmitter may have two similar co-planar loops. Although a matched receiver is described here communicating with a data signal transmitter and a scramble signal transmitter, the matched receiver may communicate with only a data signal transmitter. For example, when the data transmitter has a fast decay rate to prevent eavesdroppers from receiving the data signal, a matched receiver placed in a location near the data transmitter may have improved reception of the data signal allowing the data transmitter to have a more rapid decay rate than if a non-matched receiver is employed.

Figure 9A:
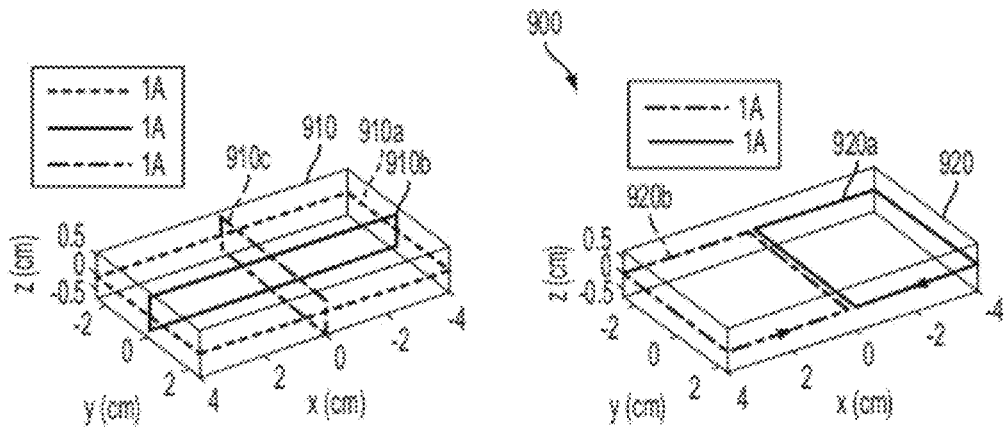
FIG. 9A is a schematic illustrating a data signal transceiver and a scramble signal transceiver according to one embodiment of the disclosure.

Operation of a matched receiver may be described with reference to FIG. 9A-9B. A coil system 900 of FIG. 9A including a transceiver 910 may transmit scramble signals from coils 910a, 910b, and 910c. In one embodiment, all scramble signals may use the same broadcast standard as a data signal. Thus, the three scramble signals contain intelligible bit streams that are uncorrelated to each other and uncorrelated to the data signal bit stream. Because the scramble signals are uncorrelated, a measure of the total scramble signal strength at any location in space may be computed as the root-mean-square (RMS) of the three individual scramble signals. A transceiver 920 may concurrently transmit a data signal from co-planar coils 920a and 920b. In the numerical calculations illustrated in FIG. 9B a matched receiver is substantially identical to the transceiver 920. In this embodiment, the data signal transmitted from the transceiver 920 decays as $1/r^4$, and the scramble signal transmitted from the transceiver 910 decays as $1/r^3$.

Figure 9B:
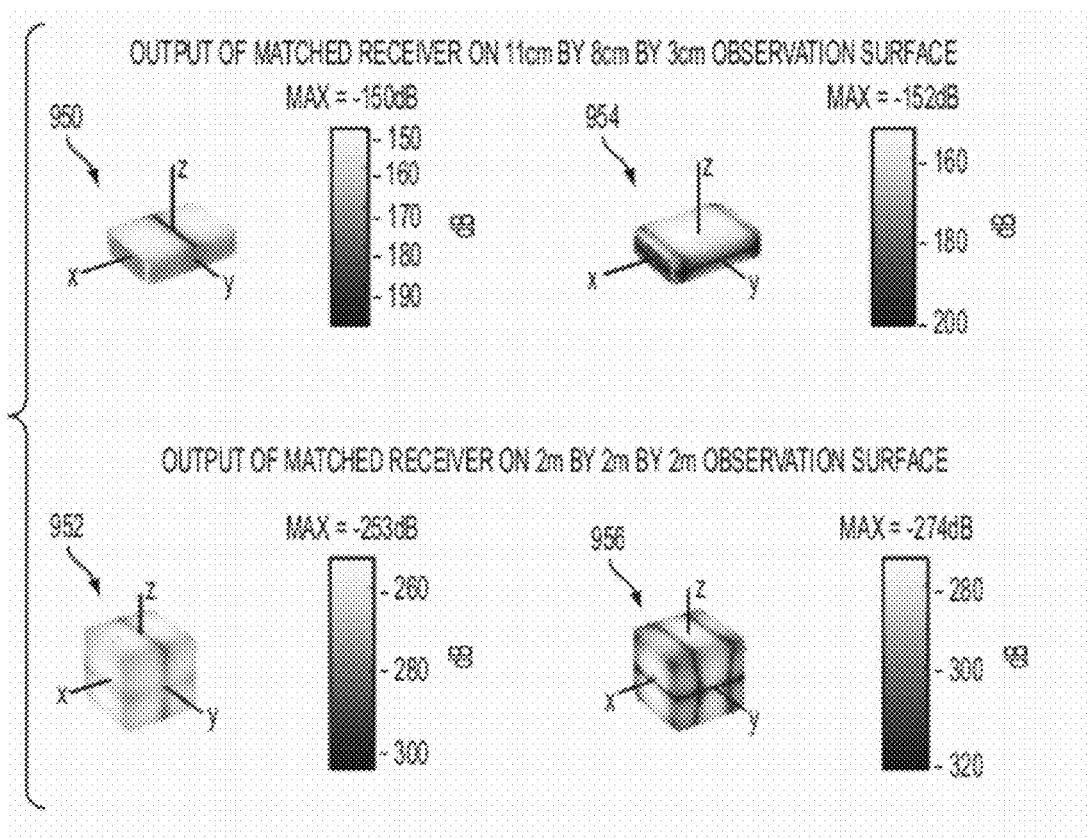
FIG. 9B is a graph of output from a matched receiver for the data signal transceiver of FIG. 9A located near the data signal transceiver and away from the data signal transceiver according to one embodiment of the disclosure.

The matched-receiver output is shown in FIG. 9B for various locations of the matched receiver. FIG. 9B is a graph of the output of a matched receiver as a function of the position of the center point of the matched receiver according to one embodiment. For example, a graph 954 shows that the data-signal output of the matched receiver is −152 dB when the center point of the matched receiver is on the z-axis at (x,y, z)=(0, 0, 1.5 cm) above the data-signal coils. Similarly, a graph 950 shows that the scramble-signal output of the matched receiver is about −170 dB when the center point of the matched receiver is at (x,y,z)=(0, 0, 1.5 cm). When the matched receiver is in its intended position, the data signal overshadows the scramble signal. In other words, with the matched receiver in its intended position, it receives the data signal strongly and at the same time rejects most of the scramble signal. By changing the current strength in the coils 910a, 910b, 910c, 920a, and 920b, the data signal output may be adjusted to exceed the scramble signal output by an arbitrary or user-desired amount. Graphs 952 and 956 are similar to the graphs 950 and 954, respectively, but are calculated for an eavesdropper having a matched receiver on an observation surface 2 meters by 2 meters by 2 meters from the signal source. Graphs 952 and 956 illustrate that even if an eavesdropper had a matched receiver, it would be difficult or impossible to record the data signal since the scramble-signal output is stronger than the data-signal output.

Figure 10:
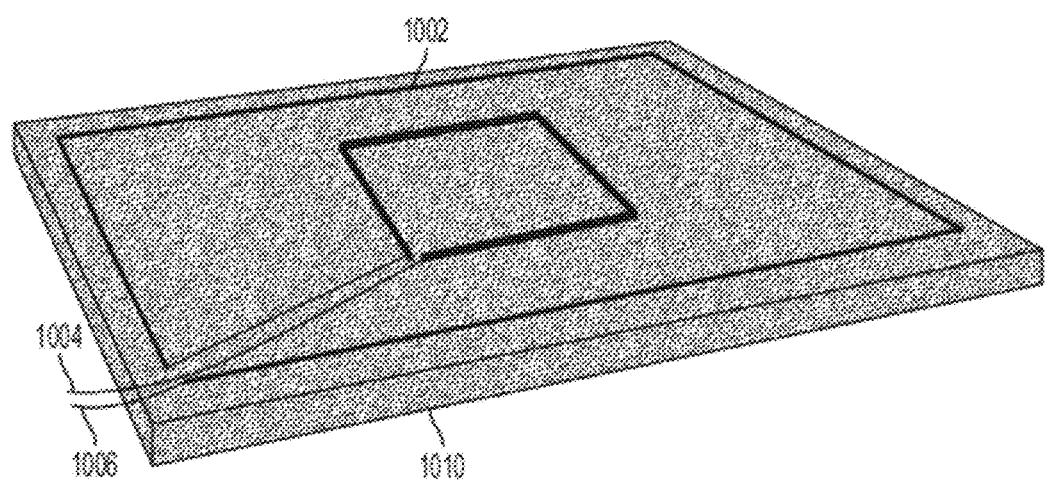
FIG. 10 is a schematic illustrating a matched receiver with concentric coils according to one embodiment of the disclosure.

Although the above examples describe transceivers with co-planar coils, concentric coils may also be employed in a transceiver. FIG. 10 is a schematic illustrating a matched receiver with concentric coils according to one embodiment of the disclosure. A matched receiver includes a wire 1002 having leads 1004 and 1006 wrapped into an outer coil and a concentric inner coil. The area of the outer coil may be four times the area of the inner coil and have one fourth the number of windings. The matched receiver may be in close proximity to a box 1010 having a data signal transmitter (not shown) and a scramble signal transmitter (not shown) during authorized data transmissions. According to one embodiment, the concentric coils may have a $1/r^5$ rate of decay of the data signal.

Figure 11A:
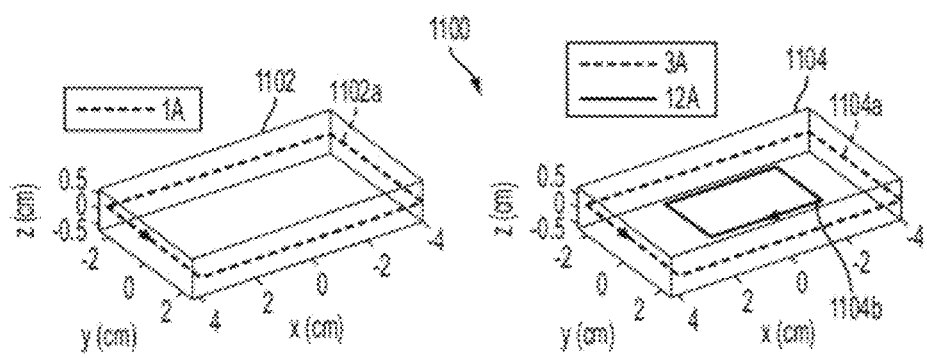
FIG. 11A is a schematic illustrating a data signal transceiver and a scramble signal transceiver according to one embodiment of the disclosure.
Figure 11B:
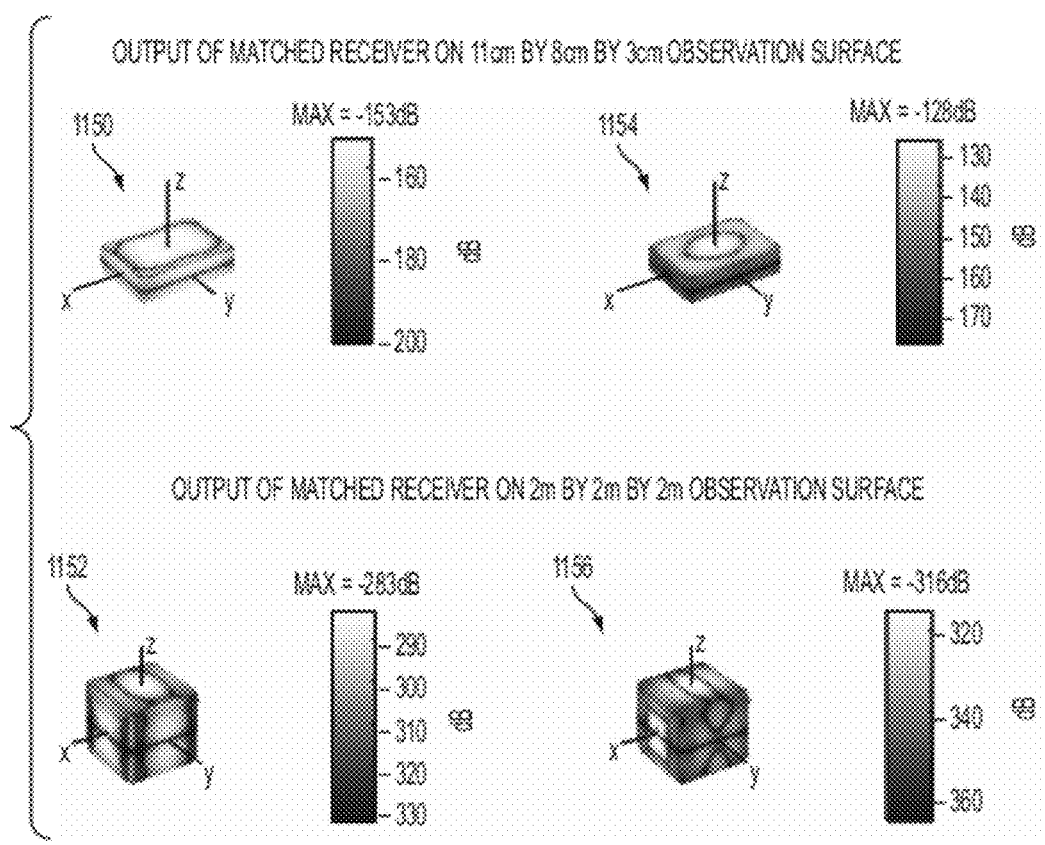
FIG. 11B is a graph of output from a matched receiver for the data signal transceiver of FIG. 11A located near the data signal transceiver and away from the data signal transceiver according to one embodiment of the disclosure.

FIG. 11A illustrates a coil system 1100 including a first transceiver 1102 having a coil 1102a transmitting a scramble signal and a second transceiver 1104 having concentric coils 1104a and 1104b transmitting a data signal. Alternatively, the first transceiver 1102 may be modified to include additional loops.

In this embodiment, maximum values for the data signal and scramble signal outputs of a matched receiver occur at the same locations. For example, a graph 1154 shows that the data-signal output of the matched receiver is −128 dB when a center point of the matched receiver is on the z-axis 1.5 cm above the data-signal coils. The corresponding value for the scramble signal output of the matched receiver is seen in a graph 1150 to be −153 dB. Hence, when the matched receiver is in its intended position, the data signal overshadows the scramble signal. This embodiment does not require precise alignment of the authorized receiver.

Graphs 1152 and 1156 show the output of the matched receiver on a surface with dimensions 2 m by 2 m by 2 m. The graphs 1152 and 1156 illustrate that even if an eavesdropper had a matched receiver, it would be difficult or impossible to record the data signal (even if no scramble signal is broadcast) since the data signal has decayed by almost 200 dB. Moreover, the scramble-signal output is stronger than the data-signal output in the region where the data signal is strongest in the graphs 1152 and 1156.

Figure 12:
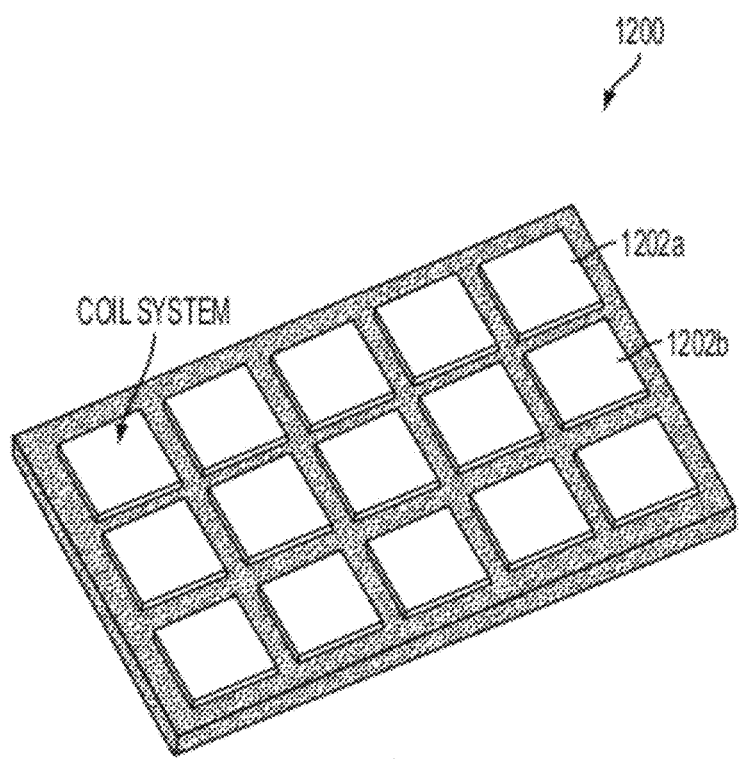
FIG. 12 is a schematic illustrating an array of transceivers according to one embodiment of the disclosure.

A transceiver may be used to both transmit and receive. For example, the system shown in FIG. 11A may be used for both transmission and reception. According to one embodiment, an array of transceivers may be designed to allow the creation of matched receiver conditions for many different locations of the other transceiver. FIG. 12 is a schematic illustrating an array of transceivers according to one embodiment of the disclosure. Each of the transceivers 1202a, 1202b, etc., may include a coil system (whether a single coil, co-planar coils, concentric coils, or the like). One or more of these transceivers 1202a, 1202b, etc., may be activated for a given location of a second transceiver in order to achieve a matched receiver condition.

Figure 13:
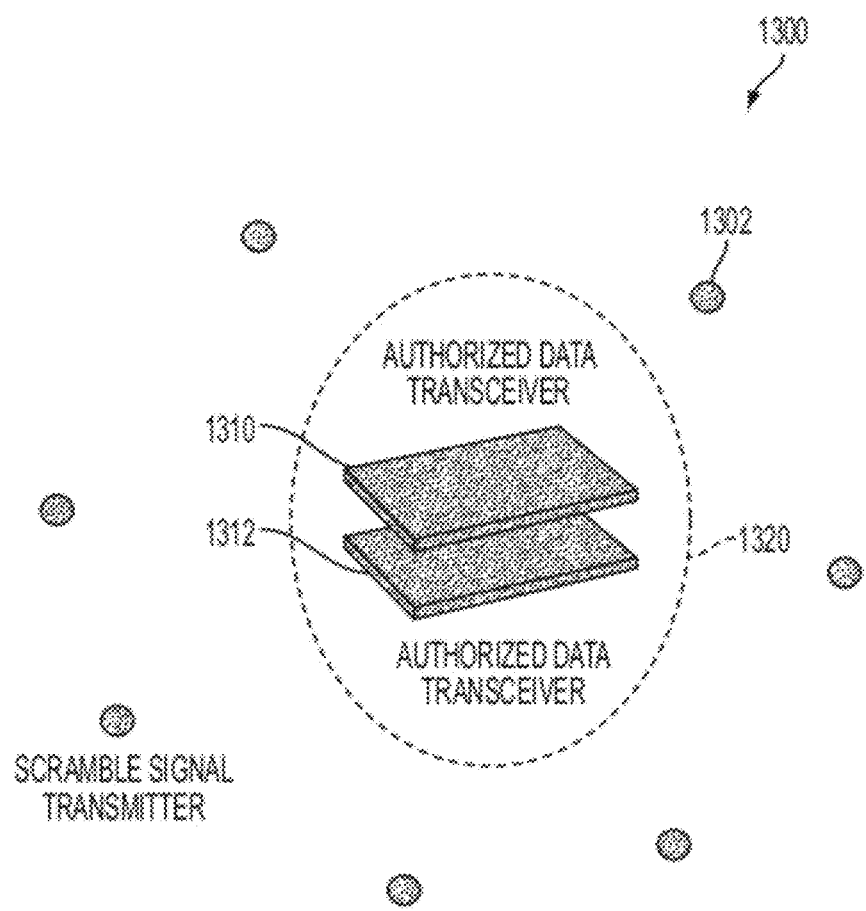
FIG. 13 is a block diagram illustrating an authorized data transmission region according to one embodiment of the disclosure.

According to one embodiment, a region in which an authorized data transmission occurs may be shielded by broadcasting scramble signals from scramble signal transmitters placed in the vicinity of the authorized data transmission region as shown in FIG. 13. FIG. 13 is a block diagram illustrating an authorized data transmission region according to one embodiment of the disclosure. An NFC system 1300 includes a number of scramble signal transmitters 1302 transmitting scramble signals that overshadow a data signal outside of an authorized data transmission region 1320. Inside the authorized data transmission region 1320, data signals may be exchanged between the authorized data transceivers 1310 and 1312 because the data signals overshadow the scramble signals transmitted by the scramble signal transmitters 1302 within the authorized data transmission region 1320. Alternatively, the authorized data transceivers 1310 and 1320 may be matched to substantially reject the scramble signals. According to one embodiment, the scramble signal transmitters 1302 may have nulls (zero or low magnetic induction strength) in the authorized data transmission region 1320.

Figure 14:
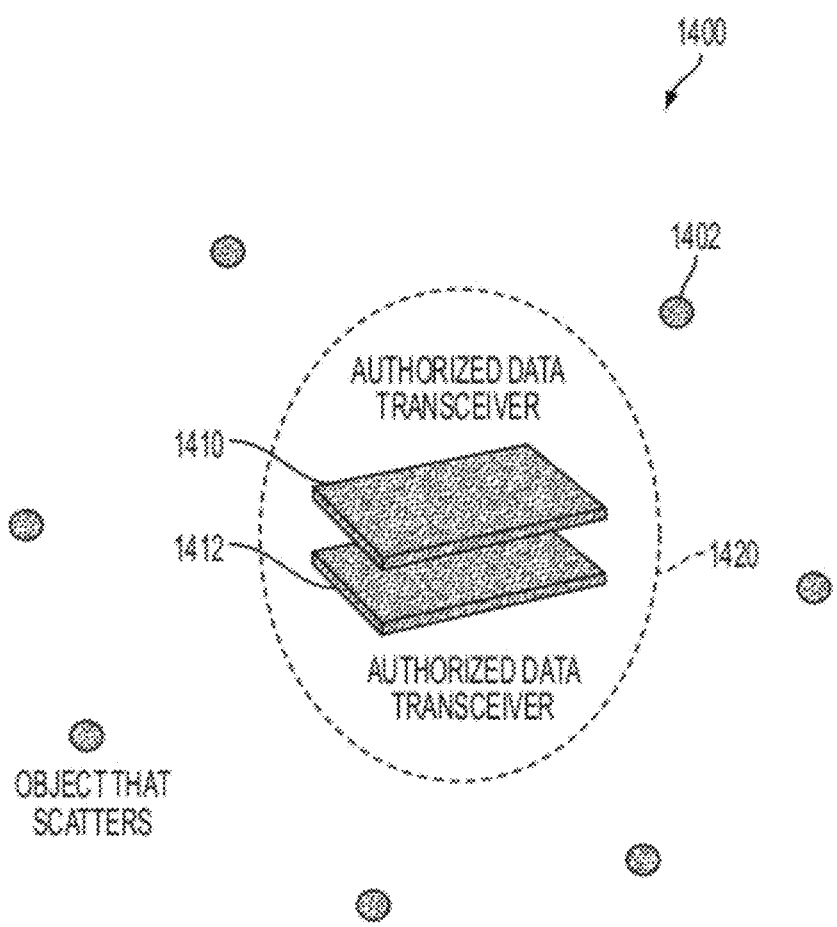
FIG. 14 is a block diagram illustrating an authorized data transmission region defined by object scatterers according to one embodiment of the disclosure.

The transmitters 1302 may instead be replaced with scattering objects. FIG. 14 is a block diagram illustrating an authorized data transmission region defined by object scatterers according to one embodiment of the disclosure. An NFC system 1400 includes a number of scattering objects 1402 to create a diffuse distribution of scramble signals and data signals outside of an authorized data transmission region 1420. Inside the authorized data transmission region 1420, data signals may be exchanged between the authorized data transceivers 1410 and 1412 because the data signals overshadow the scramble signals.

According to one embodiment, the scattering objects 1402 (or scramble signal transmitters 1302) may be packaged along with one authorized data transceiver 1410. The package may be placed, for example, at a check-out terminal, register station, or secure access point. When a user is ready to check out or provide mobile payment for products or services, the user places their authorized transceiver 1412 in the authorized data transmission region 1420 to pass financial information to the terminal or register. The user's authorized transceiver 1412 may be located in a credit card, bank card, keychain fob, or mobile device such as a smartphone. Eavesdroppers outside of the authorized data transmission region 1420 may be unable to read the user's financial transaction information improving the security of the communications. In another example, a user may use the authorized transceiver 1412 to transmit user authentication information to the authorized transceiver 1410. For example, the package containing the authorized transceiver 1410 and the scattering objects 1402 (or scramble signal transmitters 1302) may be located at a locked door. When the user presents their authorized transceiver 1412 in the authorized data transmission region 1420 the door may unlock to allow the user to enter.

The embodiments described above for improving security of NFC systems may be employed in combination with other security measures. For example, an NFC system that includes a scramble signal and a data signal may also employ encryption of the data signal. Thus, an eavesdropper has a reduced likelihood of receiving the data signal. Even if the eavesdropper receives an intelligible data signal, the data signal may be encrypted and difficult or impossible to decrypt. Thus, the secure NFC embodiments disclosed above may be combined with other security measures, such as encryption, to further improve NFC security.

Although the present disclosure and its advantages have been described in detail, it should be understood that various changes, substitutions and alterations can be made herein without departing from the spirit and scope of the disclosure as defined by the appended claims. In particular, the systems, apparatuses, and methods discussed above may be applied to any communications system that employs inductive coupling. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
    transmitting a data signal with a data field distribution having a first decay rate, in which the data signal carries user data;
    transmitting one or more scramble signals with one or more scramble field distributions corresponding to the one or more scramble signals having a second decay rate different from the first decay rate, in which the scramble signal does not carry user data; and
    adjusting the data field distribution and the scramble field distributions such that one or more of the scramble signals overshadow the data signal in all but selected regions.

2. The method of claim 1, in which the step of transmitting the data signal comprises transmitting from an antenna having approximately zero magnetic dipole moment and in which the step of transmitting one or more scramble signals comprises transmitting from an antenna having non-zero magnetic dipole moment.

3. The method of claim 1, in which the step of adjusting the distributions comprises adjusting the strength of coefficients in a multipole expansion of the data field distribution and the strength of coefficients in a multipole expansion of the one or more scramble field distributions.

4. The method of claim 1, in which the step of adjusting the data field distribution and the scramble field distribution comprises adjusting a transmission power of the data signal and a transmission power of the one or more scramble signals.

5. The method of claim 1, in which the step of adjusting the data field distribution and the scramble field distribution comprises adjusting a directionality of the data signal and a directionality of the one or more scramble signals.

6. The method of claim 1, in which the step of transmitting the data signal comprises transmitting from co-planar coils having a first decay rate of $1/r^4$.

7. The method of claim 1, in which the step of transmitting the data signal comprises transmitting from concentric coils having a first decay rate of $1/r^5$.

8. The method of claim 7, in which the step of transmitting the scramble signal comprises transmitting from a single coil having a second decay rate of $1/r^3$.

9. The method of claim 1, in which the step of transmitting the data signal comprises transmitting at least one of financial transaction information and user authentication information.

* * * * *